United States Patent Office 3,442,770
Patented May 6, 1969

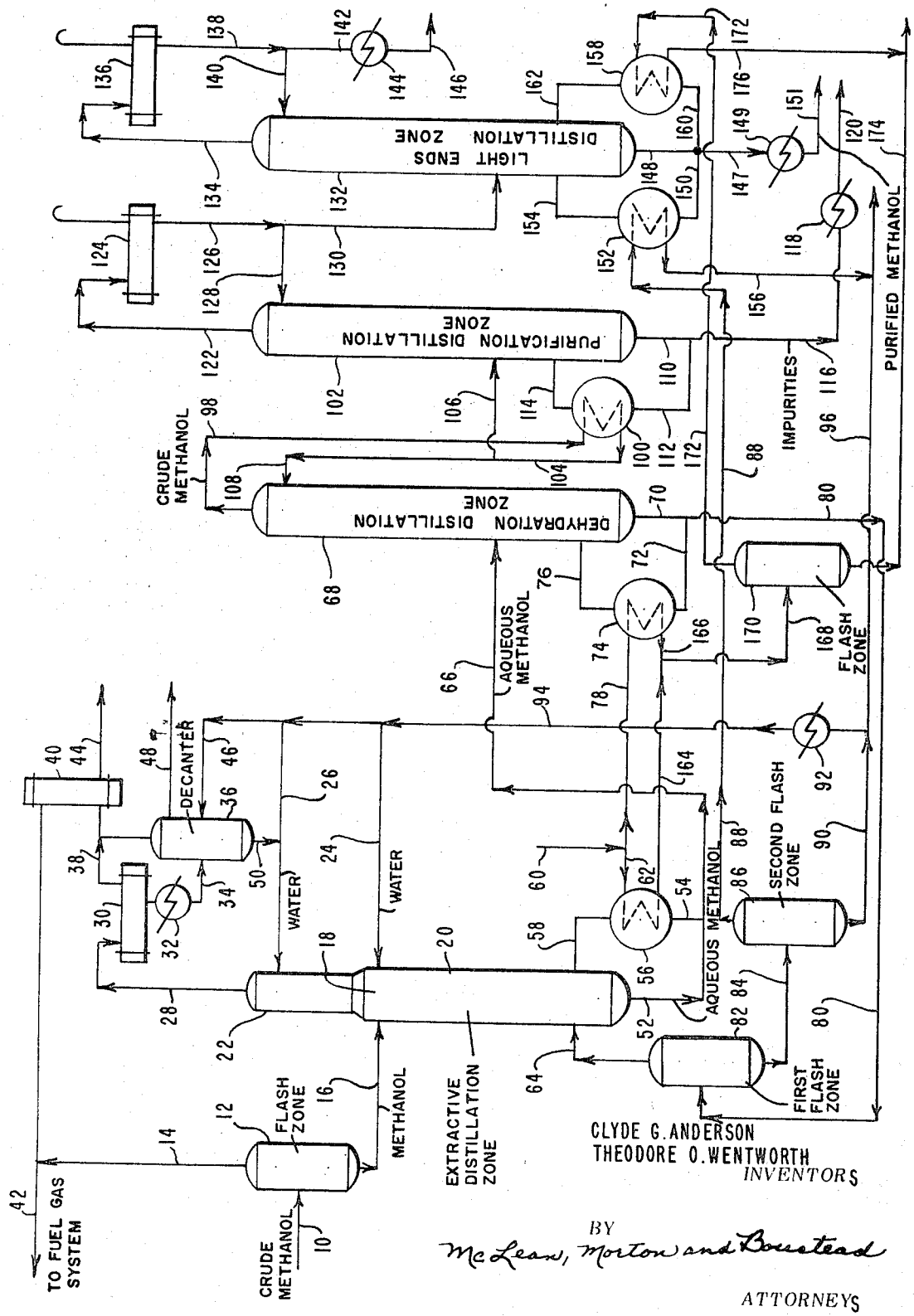

3,442,770
PROCESS FOR THE PURIFICATION OF METHANOL BY EXTRACTIVE DISTILLATION AND PLURAL STAGE DISTILLATION RECOVERY
Theodore O. Wentworth and Clyde G. Anderson, Cincinnati, Ohio, assignors to Vulcan-Cincinnati, Inc. Cincinnati, Ohio, a corporation of Ohio
Filed Dec. 21, 1967, Ser. No. 692,414
Int. Cl. B01d 3/38
U.S. Cl. 203—25    9 Claims

ABSTRACT OF THE DISCLOSURE

A process for the purification of synthetic methanol is shown. Crude methanol containing organic impurities is subjected to aqueous extractive distillation whereby essentially all water insoluble higher boiling impurities and some other impurities are removed as an overhead stream. The bottom stream from the aqueous extractive distillation zone is dehydrated and the overhead stream therefrom containing methanol and impurities is purified in a distillation zone from which essentially all of the soluble higher boiling impurities are removed. The overhead stream from the purification distillation zone is subjected to light ends distillation and the bottom stream is pure methanol product. In a preferred embodiment, the water stream from the dehydration distillation zone is flashed to provide steam for one or more of the other distillation zones.

---

This invention relates to a process for the purification of crude synthetic methanol containing organic impurities. More specifically, this invention relates to a process for the removal of substantially all the impurities in synthetic methanol by means of an extractive distillation in combination with further distillation steps which process provides a purified product and an economy of operation not heretofore realized.

In the synthesis of methanol from hydrogen, carbon dioxide and carbon monoxide at elevated temperatures and pressures, a range of organic compounds are simultaneously formed and much effort has been expended in developing processess for the removal of these impurities from the crude methanol. These organic byproducts are generally oxygenated compounds such as alcohols, ethers, aldehydes and ketones and they have a range of volatilities both lesser and greater than that of methanol. These low and high boilers are usually removed from the methanol by distillation techniques and several patents have disclosed the concept of extractive distillation. Thus, for example, Great Britain Patent No. 660,773 discloses the removal of components having boiling points above that of methanol (high boilers) along with lower boiling components (low boilers) from the overhead of an extractive distillation zone. An improvement on the basic extractive distillation technique is disclosed in U.S. Patent No. 3,230,156 wherein a lesser amount of water is used in the aqueous extractive distillation step and sidestreams containing higher boiling components are removed from the extractive distillation zone. Methanol consumers have more recently required a more highly purified methanol and conventional distillation techniques such as those described above are no longer satisfactory to provide the high specification methanol product.

It is thus the primary object of this invention to provide a process for the purification of methanol produced by catalytic synthesis or by partial hydrocarbon oxidation which effectively removes essentially all of the higher and lower boiling byproducts of the synthesis.

It is a further object of this invention to provide a methanol purification process which employs the known extractive distillation technique in combination with other distillation steps in a manner which provides maximum processing economy in the preparation of a highly purified methanol product.

Before describing the present invention in detail, it is worthwhile to consider the characteristics of the several byproduct impurities formed in the methanol synthesis. The compounds can be generally classified as those having higher and lower boiling points than methanol and those which are soluble and insoluble in water. In addition, several of the compounds form azeotropes with methanol or water. In Table I set forth below the known impurities in crude methanol are listed and their boiling points under normal conditions given. It is important to note the characteristics of the several impurities since the process herein has been developed to remove all of these components from crude methanol with a maximum of operating efficiency.

A process for the purification of crude synthetic methanol containing water soluble and water insoluble inorganic impurities boiling at temperatures higher and lower than that of methanol has been discovered. Crude methanol is introduced into an aqueous extractive distillation zone wherein the concentration of water is maintained at at least 70% throughout. The methanol is extractively distilled and an overhead product is removed which comprises essentially all of the water insoluble higher boiling impurities as well as a substantial portion of the lower boiling impurities and a portion of the water soluble higher boiling impurities. A bottoms stream is removed from the extractive distillation zone containing aqueous methanol and the remainder of the impurities introduced with the crude feed stream. These bottoms are then introduced into a dehydration distillation zone wherein essentially all of the water is removed as a bottoms stream and crude methanol containing essentially all of the impurities not removed in the extractive distillation zone is removed as an overhead stream. The latter overhead stream is then subjected to purification in a third zone. The bottoms stream from that zone contains essentially all of the remaining soluble higher boiling impurities while the overhead stream contains methanol and lower boiling impurities. The lower boiling impurities are then removed in a final light ends distillation zone and purified methanol is removed as a bottoms stream. With the above described process it is possible to remove essentially all of the impurities, higher and lower boiling, water soluble and water insoluble, from the crude methanol.

In order to provide maximum economy in the above described distillation procedure, which is more effective if more complicated than conventional techniques, it is important to operate the several distillation zones at pressures which permit the recoupment of heat values in a novel fashion. The bottoms stream from the dehydration zone is flashed to provide steam for the extractive distillation zone and/or the light ends distillation zone. In a preferred embodiment described more fully below, the dehydration zone bottoms are flashed in two successive zones, the vapors from these zones being used in the extractive distillation zone and light ends distillation zone, respectively. Still further economies are achieved by using the overhead vapor from the dehydration distillation zone to reboil the purification distillation zone.

IN THE DRAWINGS

The figure is a flow sheet for a preferred process for the purification of crude synthetic methanol according to the present invention.

A liquid stream of crude methanol at high pressure is introduced via line 10 to flash zone 12, which is maintained at from 400 to 800 p.s.i.a. The vapor from flash zone 12, which contains inert components and some light ends, is removed from flash zone 12 via line 14 and is vented to a fuel gas system. The liquid from the flash zone is passed via line 16 to an aqueous extractive distillation zone 18. This distillation zone is maintained at a pressure of 0 to 100 p.s.i.g., preferably 30 to 60 p.s.i.g., and is of conventional design. The zone has a lower section 20 wherein insoluble higher boiling impurities are stripped from aqueous methanol and an upper section 22 wherein methanol vapors are condensed out of the stripping vapor. Water is introduced to distillation zone 18 via lines 24 and 26. Most of the water is introduced via line 24 and a portion sufficient to condense out methanol from stripping vapors is introduced via line 26. The source of the water will be discussed in greater detail below. The concentration of water in distillation zone 18 is from 70 to 95 percent by weight throughout and is preferably 75 to 85 percent. Overhead vapors from section 22 are removed via line 28 and introduced to partial condenser 30 wherein cooling and condensation takes place. The liquid phase formed in partial condenser 30 is further cooled in cooler 32 and introduced via line 34 to decanter 36. The vapor phase from partial condenser 30 passes via line 38 to vent condenser 40. The vapor phase which passes through vent condenser 40 passes via line 42 to the light ends fuel gas header. The vapor stream passing via line 42 is comprised essentially of methanol and low boiling compounds and is primarily dimethyl ether, a water soluble light end formed in the methanol synthesis. The liquid phase formed in vent condenser 40 passes via line 44 out of the process. This stream is comprised essentially of methanol and low boiling impurities, although a greater amount of the former is found than in vapor stream 42. The liquid in decanter 36 is admixed with a quantity of recycle water introduced via line 46. The water aids the separation of two phases within the decanter. The upper phase, which includes essentially all of the water insoluble high boiling impurities in the crude methanol feed stream as well as a small amount of methanol and other impurities, is removed via line 48 from the process. The aqueous, lower phase is recycled to zone 22 via lines 50 and 26.

An aqueous methanol solution having a concentration of from 2 to 30 percent by weight methanol is removed from extractive distillation zone 18 via line 52. A portion of the aqueous methanol solution is passed via line 54 into reboiler 56 where it is vaporized and returned via line 58 to the lower portion of extractive distillation zone 20. Reboiler 56 is heated by means of steam introduced therein via lines 60 and 62. Additional steam is added to the lower part of extractive distillation zone 20 via line 64. The source of this steam will be discussed in greater detail below.

The net bottoms product of extractive distillation zone 18 passes via line 66 to dehydration distillation zone 68. The sole purpose of this distillation zone is to remove the aqueous extraction medium from methanol and the remaining lower boiling and water soluble higher boiling impurities. The dehydration distillation zone is operated at a pressure of 0 to 150 p.s.i.g. and preferably is operated at a pressure of 50 to 100 p.s.i.g. The bottoms product from dehydration distillation zone 68, comprised essentially of water with a small amount of methanol, is removed via line 70. A portion thereof is passed via line 72 to reboiler 74 and is vaporized therein and returned via line 76 to the lower part of distillation zone 68. Steam for heating reboiler 74 is provided via lines 60 and 78.

The net bottoms product of dehydration distillation zone 68 passes via line 80 to first aqueous flash zone 82. The pressure is let down in flash zone 82 and the vapors formed therein pass via line 64 to the lower part of extractive distillation zone 18. The liquid phase from first aqueous flash zone 82 passes via line 84 to second aqueous flash zone 86 wherein the pressure is reduced still further to provide a vapor stream 88 which is discussed further below. The liquid stream from second flash zone 86, which is substantially cooler by reason of two successive flashes than the bottoms temperature of dehydration distillation zone 68, passes via line 90 to cooler 92 and then passes via line 94 to lines 24, 26 and 46, the water feed lines to extractive distillation zones 20, 22 and decanter 36, respectively. Excess water introduced into the crude synthetic methanol feed passes out of the process via line 96.

The overhead product from dehydration distillation zone 68 consisting of dry methanol, residual low boiling impurities and soluble high boiling impurities, passes via line 98 to reboiler 100 associated with purification distillation zone 102. The organic stream is condensed in reboiler 100. The condensate is in part refluxed to dehydration zone 68 via lines 104 and 108 and the net overhead make of dehydration zone 68 passes via lines 104 and 106 to purification distillation zone 102.

Purification distillation zone 102 removes essentially all of the soluble higher boiling impurities from methanol and residual lower boiling impurities; these soluble higher boiling impurities are removed as a bottoms product via line 110. A portion thereof passes line 112 to reboiler 100, is vaporized therein and passes via line 114 back to purification distillation zone 102. The net bottoms stream passes via line 116 to cooler 118 and is then removed from the process via line 120. The overhead stream from purification distillation zone 102 which consists essentially of methanol and the small remaining amount of lower boiling impurities, passes via line 122 to condenser 124. Condensate from condenser 124 is removed via line 126, a portion thereof passing via line 128 as reflux to purification distillation zone 102 and the net overhead product of the latter distillation zone passing via line 130 to light ends distillation zone 132. Purification distillation zone 102 is operated at vacuum to 30 p.s.i.g. and preferably the pressure is 0 to 15 p.s.i.g. Lower pressures are desirable to permit use of the overhead vapor from the dehydration zone as a source of heat to reboiler 100.

The remaining lower boiling impurities in stream 130 are removed from the methanol in light ends distillation zone 132. This zone is operated at pressures from 0 to 30 p.s.i.g. and preferably from 0 to 15 p.s.i.g. An overhead stream containing these impurities passes via line 134 to condenser 136 The condensate therefrom is removed via line 138, a portion passing via line 140 as reflux to distillation zone 132 and the net product of light end impurities passing via line 142, cooler 144 and line 146 out of the process. Pure methanol is removed as a bottoms stream via line 148 from light ends distillation zone 132. A portion of the purified methanol is passed via line 150 to reboiler 152. It is vaporized therein and passes via line 154 to the lower part of distillation zone 132. The net production of methanol passes via line 147 through cooler 149 and is removed from the process via line 151. Reboiler 152 is heated with steam produced in second aqueous flash zone 86, the steam formed in that zone passing to reboiler 152 via line 88. Condensate from reboiler 152 passes via line 156 to line 96 and is removed from the process. A second reboiler 158 is provided for light ends distillation zone 132. Liquid methanol passes thereto via line 160 and vapors formed therein are returned to distillation zone 132 via line 162. Steam from reboiler 158 is provided by joining the condensate formed in reboilers 56 and 74, associated with extractive distillation zone 18 and purification distillation zone 68, respectively, and flashing that condensate to provide additional steam for the reboiling of light ends distillation zone 132. More specifically, condensate from reboiler 56 is removed via line 164 and condensate from reboiler 74 is removed via line 166. The two condensate streams are joined in line 168 and pass to steam flash zone 170. Vapor from this flash zone passes via line 172 to reboiler 158. The remaining condensate from flash zone 170 passes therefrom via line 174 and is joined with condensate passing from reboiler 158 via line 176. The combined condensate is removed from the process area and returned to the steam generation system.

The process scheme disclosed in the figure is shown in more detail in the following specific process example.

EXAMPLE

The stream numbers below refer to those appearing in FIG. 1 and the flow rates are in pounds per hour of the several components. The temperatures and pressures of the streams are also given. The following abbreviations are used throughout:

MEOH—Methanol
DME—Dimethyl ether
L.B.—Low boilers
S.H.B.—Water soluble high boilers
INS. H.B.—Water insoluble high boilers

COMPONENTS OF CRUDE METHANOL

| Low Boilers | Boiling Point (760 mm.), °C. | Azeotrope With Methanol | | Water Solubility | Methanol Solubility | Azeotrope With Water | |
|---|---|---|---|---|---|---|---|
| | | Boiling Point | Wt. Percent Methanol | | | Boiling Point | Mol Percent Organic |
| Dimethyl ether | −23.7 | | | S | | | |
| Diethyl ether | 34.6 | | | INS | | 34.15 | 95 |
| Methyl formate | 32.0 | | | INS | | | |
| Ethyl formate | 54.3 | 50.95 | 16 | INS | | | |
| Methylal | 42.3 | 41.85 | 8.2 | INS | | | |
| Acetone | 56.5 | 55.7 | 12 | | | | |
| Methyl acetate | 57.8 | 54.0 | 19 | INS | | | |
| Methyl propyl ether | 39.1 | | | | | | |
| Ethyl propyl ether | 61.7 | | | | | | |
| Methyl mercaptan | 6.8 | | | | | | |
| Ethyl mercaptan | 35.6 | | | INS | | | |
| Dimethyl amine | 7.4 | | | INS | | | |
| Diethyl amine | 55.0 | | | INS | | | |
| Acetaldehyde | 64.3 | 57.5 | 24.2 | | | | |
| Methanol | 64.5 | | | | | | |
| High Boilers: | | | | | | | |
| Ethanol | 78.4 | | | S | | 78.15 | 89.43 |
| Iso-propanol | 82.5 | | | S | | 80.37 | 68.54 |
| N-propanol | 97.8 | | | S | | 87.72 | 43.17 |
| Butanol | 108–117.5 | | | INS | | 79.9–92.3 | 65–25 |
| Pentanol | 101–142 | | | INS | | 87–95 | 13–4 |
| Propyl formate (iso) | 68.3 | | | INS | | | |
| Propyl formate (N) | 81.3 | | | INS | | | |
| Methyl ethyl ketone | 79.6 | | | INS | | | |
| Ethyl acetate | 77.1 | 62.95 | 44 | INS | | 73.45 | 77 |
| Propyl mercaptan | 67.4 | | | INS | | 70.4 | 76 |
| Croton-aldehyde | 102.2 | | | INS | | | |
| Ethylal | 89 | | | INS | | | |

| | Stream No. 10 | | Stream No. 14 | | Stream No. 16 | | Stream No. 42 | | Stream No. 44 | |
|---|---|---|---|---|---|---|---|---|---|---|
| Temperature, °F | 100 | | 100 | | 100 | | 100 | | | |
| Pressure, p.s.i.a | 400 | | 400 | | 60 | | 50 | | 50 | |
| | P.p.h. | Percent | P.p.h. | Percent | P.p.h. | Percent | P.p.h. | Percent | P.p.h. | Percent |
| Component: | | | | | | | | | | |
| Methanol | 84,600 | 81.25 | 64 | 74.4 | 84,536 | | 81 | 10.4 | 152 | 29.1 |
| Dimethyl ether | 847 | .81 | 18 | 20.9 | 829 | | 647 | 83.1 | 200 | 38.3 |
| Low boilers | 294 | .28 | 1 | 1.2 | 293 | | 46 | 5.9 | 97 | 18.6 |
| Water soluble high boilers | 450 | .43 | Trace | | 450 | | 1 | .1 | 9 | 1.7 |
| Water insoluble high boilers | 242 | .23 | | | 242 | | | | Trace | |
| Water | 17,703 | 17.00 | 3 | 3.5 | 17,700 | | 4 | .5 | 64 | 12.3 |
| Total | 104,135 | 100.00 | 86 | 100.0 | 104,049 | | 779 | 100.0 | 522 | 100.0 |

| | Stream No. 48 | | Stream No. 46 | | Stream No. 26 | | Stream No. 24 | | Stream No. 52 | |
|---|---|---|---|---|---|---|---|---|---|---|
| Temperature, °F | | | 150 | | 150 | | 150 | | 278 | |
| Pressure, p.s.i.a | 50 | | 50 | | 50 | | 50 | | 60 | |
| | P.p.h. | Percent | P.p.h. | Percent | P.p.h. | Percent | P.p.h. | Percent | P.p.h. | Percent |
| Component: | | | | | | | | | | |
| Methanol | 47 | 10.9 | 10 | .1 | 100 | .1 | 200 | 0.1 | 84,640 | 20.00 |
| Dimethyl ether | Trace | | | | | | | | | |
| Low boilers | 30 | 6.9 | | | | | | | | |
| Water soluble high boilers | 22 | 5.1 | | | | | | | 120 | .03 |
| Water insoluble high boilers | 242 | 55.8 | | | | | | | 418 | .10 |
| Water | 92 | 21.3 | 10,300 | 99.9 | 100,000 | 99.9 | 200,000 | 99.9 | 337,153 | 79.87 |
| Total | 433 | 100.0 | 10,310 | 100.0 | 100,100 | 100.0 | 200,200 | 100.0 | 422,321 | 100.00 |

| | Stream No. 80 | | Stream No. 84 | | Stream No. 90 | | Stream No. 106 | | Stream No. 130 | |
|---|---|---|---|---|---|---|---|---|---|---|
| Temperature, °F | 317 | | 292 | | 250 | | 240 | | 170 | |
| Pressure, p.s.i.a | 87 | | 60 | | 21 | | 29 | | 26 | |
| | P.p.h. | Percent | P.p.h. | Percent | P.p.h. | Percent | P.p.h. | Percent | P.p.h. | Percent |
| Component: | | | | | | | | | | |
| Methanol | 337 | .10 | 327 | .10 | 306 | .10 | 84,303 | 99.27 | 84,247.9 | 99.84 |
| Dimethyl ether | | | | | | | | | | |
| Low boilers | | | | | | | | | | |
| Water soluble high boilers | | | | | | | 120 | .14 | 121 | .14 |
| Water insoluble high boilers | | | | | | | 418 | .49 | .8 | .001 |
| Water | 337,068 | 99.9 | 327,758 | 99.9 | 306,095 | 99.9 | 85 | 0.10 | 8.3 | .01 |
| Total | 337,405 | 100.0 | 328,085 | 100.0 | 306,401 | 100.0 | 84,926 | 100.00 | 84,378.0 | 100.00 |

COMPONENTS OF CRUDE METHANOL—Continued

|  | Stream No. 116 | | Stream No. 142 | | Stream No. 147 | |
|---|---|---|---|---|---|---|
| Temperature, °F | 194 | | 170 | | 180 | |
| Pressure, p.s.i.a | 29 | | 20 | | 28 | |
|  | P.p.h. | Percent | P.p.h. | Percent | P.p.h. | Percent |
| Component: | | | | | | |
| Methanol | 55.1 | 10 | 247.9 | 67 | 84,000 | |
| Dimethyl ether | | | | | | |
| Low boilers | | | 120.5 | 33 | .5 | .0006 |
| Water soluble high boilers | 417.2 | 76 | | | .8 | .001 |
| Water insoluble high boilers | | | | | | |
| Water | 76.7 | 14 | | | 8.3 | .010 |
| Total | 549.0 | 100 | 368.4 | 100 | 84,009.6 | |

We claim:

1. A process for the purification of crude synthetic methanol containing water soluble and water insoluble organic impurities boiling above and below methanol, comprising: introducing crude methanol and water into an aqueous extractive distillation zone wherein the concentration of water is at least 70 percent throughout said zone; extractively distilling said crude synthetic methanol in said extractive distillation zone and removing from the upper portion of said zone essentially all of said water insoluble higher boiling impurities and a substantial portion of the other impurities and removing from the lower part of said extractive distillation zone a bottoms stream of aqueous methanol containing the remainder of said other impurities; introducing the bottoms stream from said extractive distillation zone to a dehydration distillation zone and removing as an overhead stream therefrom crude methanol containing water insoluble and water soluble lower boiling impurities and water soluble higher boiling impurities and removing as a bottoms stream therefrom essentially all of the water introduced to said zone; introducing the overhead stream from said dehydration distillation zone to a purification distillation zone and removing as a bottoms stream therefrom essentially all of said water soluble higher boiling impurities and removing as an overhead stream therefrom methanol containing lower boiling impurities; and introducing said overhead stream from said purification distillation zone to a light ends distillation zone and removing therefrom a bottoms stream of pure methanol and an overhead stream comprising lower boiling impurities.

2. A process for the purification of a crude synthetic methanol as recited in claim 1 wherein prior to introducing said methanol into said aqueous extractive distillation zone, said methanol is flashed to remove as vapors a portion of said lower boiling organic impurities and the liquid from said flash is introduced to said extractive distillation zone.

3. A process for the purification of crude synthetic methanol as recited in claim 1 wherein said dehydration distillation is operated at a pressure not less than 50 p.s.i.g. and the bottoms stream from said dehydration distillation zone is flashed to provide steam, and the steam is introduced into one of said extractive distillation and light ends distillation zones.

4. The process recited in claim 3 wherein the bottoms stream from said dehydration distillation zone is passed into a first flash zone from which steam is removed for said aqueous extractive distillation zone and the liquid from said first flash zone is passed to a second flash zone wherein vapor is removed and introduced into the reboiler of said light ends distillation zone.

5. The process of claim 1 wherein the pressure of said dehydration distillation zone is maintained above 50 p.s.i.g. and the pressure of said purification distillation zone is maintained below 30 p.s.i.g. and the overhead stream from said dehydration distillation zone is condensed in the reboiler of said purification distillation zone and provides heat thereto.

6. A process for the purification of crude synthetic methanol containing water soluble and water insoluble organic impurities boiling above and below methanol, comprising: introducing crude methanol into a flash zone in order to remove as vapor inert and low boiling impurities contained therein; introducing the liquid phase from said flash zone and water into an aqueous extractive distillation zone wherein the concentration of water is, at all parts thereof, from 70 to 95 percent by weight; extractively distilling said crude synthetic methanol in said extractive distillation zone at a pressure not greater than 60 p.s.i.g.; removing from the upper portion of said zone essentially all of said water-insoluble higher boiling impurities and a substantial portion of the other impurities and removing from the lower part of said extractive distillation zone a bottoms stream of aqueous methanol containing the remainder of said impurities; introducing the bottoms stream from said extractive distillation zone to a dehydration distillation zone maintained at a pressure not less than 50 p.s.i.g.; removing a bottoms stream from said dehydration distillation zone comprising essentially all of the water introduced to said zone and flashing said bottoms stream in two successive aqueous flash zones to provide a cooled aqueous stream and vapor; recycling said cooled aqueous stream to said extractive distillation zone; introducing a portion of said vapor into said extractive distillation zone to provide heat thereto; removing an overhead stream from said dehydration distillation zone containing water insoluble and water soluble lower boiling impurities and water soluble higher boiling impurities and introducing said overhead stream into the reboiler of a purification distillation zone; removing condensed liquid from said purification distillation zone reboiler and feeding said liquid to said purification distillaton zone; distilling said. liquid therein at a pressure from 0 to 15 p.s.i.g. and removing therefrom a bottoms stream containing essentially all of said water soluble higher boiling impurities and removing as an overhead stream therefrom methanol containing lower boiling impurities; and introducing said overhead stream from said purification distillation zone to a light ends distillation zone operating at a pressure from 0 to 15 p.s.i.g. and removing therefrom a bottoms stream of pure methanol and an overhead stream comprising lower boiling impurities.

7. A process for the purification of crude synthetic methanol as recited in claim 6 wherein the vapors formed in said first aqueous flash zone are introduced into the bottom of said extractive distillation zone in order to provide heat thereto and the vapors from said second aqueous flash zone are introduced into the reboiler of said light ends distillation zone in order to provide heat thereto.

8. The process of claim 6 wherein said water recycle to said extractive distillation zone is cooled and divided into two portions, one portion being introduced to said zone along with said crude synthetic methanol feed and the other portion being introduced above the feed point of said crude synthetic methanol and first portion.

9. The process of claim 6 wherein the vapor overhead stream from said extractive distillation zone, containing substantially all of said water insoluble higher boiling impurities and a portion of said other impurities is partially condensed and the liquid phase therefrom decanted in the presence of a portion of said water recycle to said extractive distillation zone in order to aid the separation of said water insoluble higher boiling impurities from said water and methanol.

References Cited

UNITED STATES PATENTS

| | | | |
|---|---|---|---|
| 2,549,290 | 4/1951 | Congdon et al. | 203—85 |
| 2,551,626 | 5/1951 | Morrell et al. | 203—85 |
| 2,751,337 | 6/1956 | Goddin et al. | 203—83 |
| 2,993,840 | 7/1961 | Poincet | 203—27 |
| 3,230,155 | 1/1966 | Schurch | 203—26 |
| 3,230,156 | 1/1966 | Katzen | 203—93 |

FOREIGN PATENTS 660,773  11/1951  Great Britain.

WILBUR L. BASCOMB, JR., *Primary Examiner.*

U.S. Cl. X.R.

203—18, 27, 79, 85, 87, 88; 260—643